United States Patent
Todd et al.

(10) Patent No.: US 8,146,155 B1
(45) Date of Patent: Mar. 27, 2012

(54) CONTROLLING ACCESS TO CONTENT ON AN OBJECT ADDRESSABLE STORAGE SYSTEM

(75) Inventors: Stephen J. Todd, Shrewsbury, MA (US); John D. Hushon, Jr., Medfield, MA (US)

(73) Assignee: EMC Corporation, Hopkinton, MA (US)

( * ) Notice: Subject to any disclaimer, the term of this patent is extended or adjusted under 35 U.S.C. 154(b) by 1142 days.

(21) Appl. No.: 11/864,943

(22) Filed: Sep. 29, 2007

(51) Int. Cl.
*G06F 21/00* (2006.01)

(52) U.S. Cl. .......... 726/21; 713/176; 713/193; 711/112; 711/162; 711/170

(58) Field of Classification Search ................. 726/21
See application file for complete search history.

(56) References Cited

U.S. PATENT DOCUMENTS

| | | | | |
|---|---|---|---|---|
| 6,374,326 | B1* | 4/2002 | Kansal et al. | 711/108 |
| 7,921,268 | B2* | 4/2011 | Jakob | 711/162 |
| 2002/0129216 | A1* | 9/2002 | Collins | 711/170 |
| 2003/0135411 | A1* | 7/2003 | Ushiki et al. | 705/14 |
| 2003/0182501 | A1* | 9/2003 | George et al. | 711/114 |
| 2006/0031653 | A1* | 2/2006 | Todd et al. | 711/170 |
| 2006/0195902 | A1* | 8/2006 | King et al. | 726/21 |
| 2007/0073694 | A1* | 3/2007 | Picault et al. | 707/9 |
| 2007/0118687 | A1* | 5/2007 | McGovern et al. | 711/112 |
| 2008/0155652 | A1* | 6/2008 | DeBie | 726/2 |
| 2008/0256627 | A1* | 10/2008 | Kokkinen | 726/21 |

OTHER PUBLICATIONS

Mark Ferelli| Content-addressable storage—Storage as I see it| 2002| West World Productions, Inc| http://findarticles.com/p/articles/mi_m0BRZ/is_10_22/ai_98977101/print.*
An Efficient and Scalable Security Protocol for Protecting Fixed-Content Objects in Content Addressable Storage Architectures|http://ieeexplore.ieee.org/stamp/stamp.jsp?tp=&arnumber=4550309|Wassim Itani Ayman Kayssi Ali Chehab| Issue Date : Sep. 17-21, 2007.*
Deconstructing commodity storage clusters|http://ieeexplore.ieee.org/stamp/stamp.jsp?tp=&arnumber=1431546|Haryadi S. Gunawi, Nitin Agrawal, Andrea C. Arpaci-Dusseau, Remzi H. Arpaci-Dusseau, and Jiri Schindler|2005.*

* cited by examiner

*Primary Examiner* — Taghi Arani
*Assistant Examiner* — Mahfuzur Rahman
(74) *Attorney, Agent, or Firm* — Krishnendu Gupta; Robert Kevin Perkins; Joseph D'Angelo

(57) ABSTRACT

Embodiments of the invention relate to controlling access to a content unit stored on an object addressable storage (OAS) system. In one embodiment, the content unit may have an object identifier that is used to identify it on the OAS system. A first portion of a content unit may be assigned a first set of access permissions and a second portion of the content unit may be assigned a second set of access permissions that is different from the first set of access permissions.

11 Claims, 4 Drawing Sheets

CONTROLLING ACCESS TO CONTENT ON AN OBJECT ADDRESSABLE STORAGE SYSTEM

FIELD OF INVENTION

The present application relates to computer systems employing object addressable storage.

DESCRIPTION OF THE RELATED ART

Virtually all computer application programs rely on storage that may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping techniques may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of devices outside of the storage system (e.g., a host) is perceived as specifying where the data is physically stored.

In contrast to block I/O storage systems, some storage systems receive and process access requests that identify a data unit or other content unit (also referred to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments OAS systems may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

SUMMARY OF THE INVENTION

One embodiment is directed to a method of accessing a content unit stored on an object addressable storage (OAS) system, the content unit having a first portion and a second portion and being identified via an object identifier that is, from the perspective of a user accessing the content unit on the OAS system, independent of a storage location of the content unit on the OAS system. The method comprises acts of: assigning a first set of access permissions to the first portion of the content unit; and assigning a second set of access permissions to the second portion of the content unit, wherein the second set of access permissions is different from the first set of access permissions. Another embodiment is directed to at least one computer readable medium encoded with instructions that, when executed, perform the above-described method.

A further embodiment is directed to an object addressable storage (OAS) system that stores a content unit having a first portion and a second portion and being identified via an object identifier that is, from the perspective of a user accessing the content unit on the OAS system, independent of a storage location of the content unit on the OAS system. The OAS system comprises: an interface that receives an indication of a first set of access permissions for the first portions of the content unit and a second set of access permissions, different from the first set of access permissions, for the second content unit; and at least one controller, coupled to the interface, that: assigns the first set of access permissions to the first portion of the content unit; and assigns a second set of access permissions to the second portion of the content unit.

DETAILED DESCRIPTION

Figure 1:
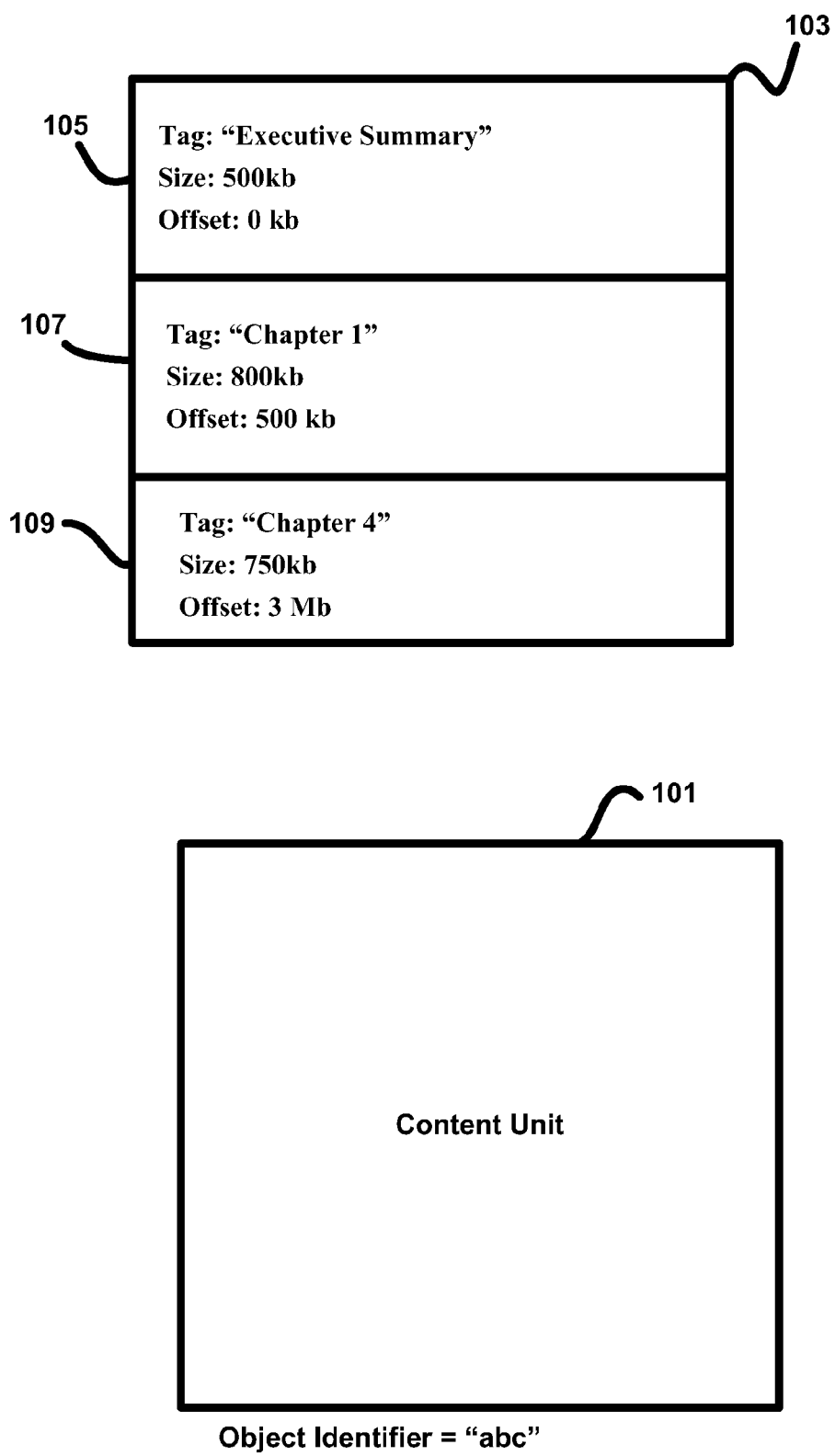
FIG. 1 is a block diagram of a system in which metadata that defines separately accessible portions of a content unit may be stored, in accordance with one embodiment of the invention.

As discussed above, a content unit that is stored on an object addressable storage (OAS) system may be associated with an object identifier. Typically, when an OAS system receives an access request for a content unit that identifies the requested content unit using its object identifier, the OAS system retrieves the content unit and returns it in response to the access request.

Applicants have appreciated that in some situations a host computer or application program that initiated the request for a content unit may not desire all of the content of a content unit, but rather desires access to only a portion of its content. However, in some OAS systems there is no way to request access to a portion of the content unit and specify the portion of the content unit that is desired in an access request for the content unit. This wastes system resources (e.g., network bandwidth), as the entire content unit may be sent from an OAS system to a host computer in response to an access request for the content unit, even though the host computer may not be interested in much of the content that is sent.

In addition, in conventional OAS systems, access permissions for content units are typically defined on an individual content unit basis. That is, for example, the users (e.g., persons, application programs, host computers, or any other type of user) that are permitted to access a content unit and the types of access that each user has (e.g., read, write, delete) may be separately defined for each individual content unit.

However, Applicants have appreciated that, in some situations, it may be desirable to set access permissions applicable to any particular portions of a content unit. For example, it may be desired to grant a first user access to a first portion of the content unit, but not to a second portion of the content unit, a second user access to the second portion of the content unit, but not the first portion, and a third user access to all the content of the content unit.

Applicants have contemplated that providing the capability to access only a portion of a particular content unit and/or controlling access permissions for particular portions of content units may be accomplished by dividing a content unit into multiple smaller content units and assigning a separate object identifier to each of these smaller content units.

For example, if it is desired to allow some users to access only a first portion of a content unit, some users to access a second portion, and some users to access the entire content unit, the content unit may be divided into two content units, one of which stores the first portion of the original content unit, one of which stores the second portion of the original content unit, and each of which has a separate identifier.

However, Applicants have appreciated that this solution may be undesirable because users that have access to, and desire to access, all of the content of the original content unit may now be required to keep track of two separate object identifiers for the content unit and may be required to issue two separate access requests when it is desired to access all of the content of the original content unit. In addition, such users may need to track the order of these content units. That is, the users may need to keep track of the fact that one content unit preceded the other (and not vice versa) in the original content unit. This may be undesirable because it imposes additional burdens on users that desire to, and have permission to, access content that is spread across multiple content units generated by subdividing the original content unit.

Thus, some embodiments are directed to OAS systems in which users may access portions of a content unit that are accessible as an integral content unit via a single identifier and is stored on the OAS system without accessing the entire content unit and/or OAS systems in which different access permissions may be assigned to different portions of a single content unit.

In some embodiments, an access request for content stored on an OAS system may specify a portion of a content unit to be returned. This may be done in any suitable way, as the invention is not limited in this respect.

For example, in some embodiments the OAS system may store metadata for the content unit that tags each portion of the content unit that is separately accessible. For example, as shown in FIG. 1, an OAS system may store a content unit 101, having an object identifier "abc". The OAS system may also store metadata 103 for content unit 101. Metadata 103 includes a tag for each portion of content unit 101. For example, tag 105 is named "Executive Summary" and corresponds to the portion of content unit 101 from byte 0 to 500 kilobytes, tag 107 is named "Chapter 1" and corresponds to the 800 kilobytes of content unit 101 that begin 500 kilobytes in, and tag 109 is named "Chapter 4" and corresponds to the 750 kilobytes of content unit 101 that begin three megabytes in.

Figure 2:
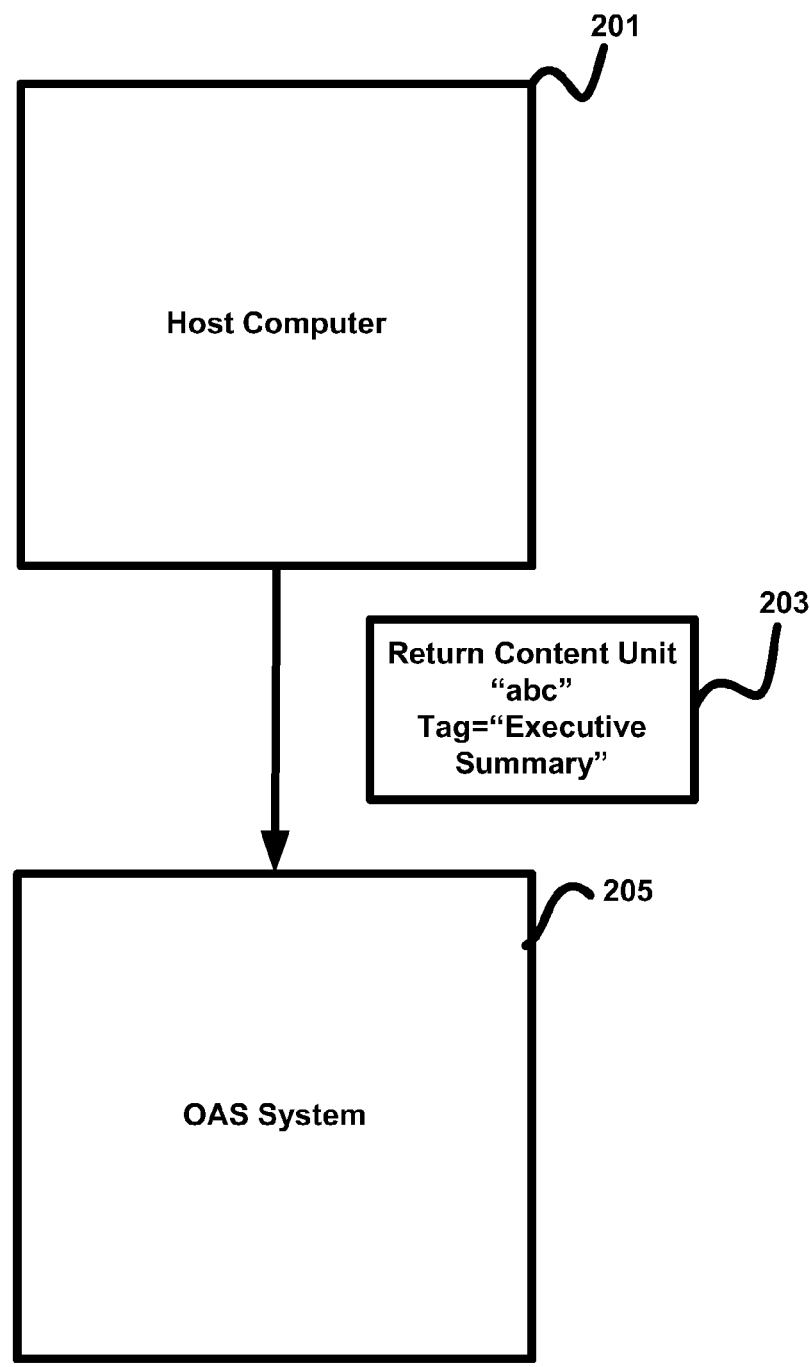
FIG. 2 is a block diagram of a system in which a request for a content unit on an OAS system may indirectly specify a portion of the content unit to be accessed, in accordance with one embodiment.

Thus, for example, an access request (e.g., issued by a host computer) to the OAS system for a portion of content unit 101 may specify the object identifier for the content unit and a tag name indicating the portion of the content unit that is desired. For example, as shown in FIG. 2, host computer 201 may send an access request 203 to OAS system 205. Access request 203 may request that OAS system return the "Executive Summary" portion of the content unit having object identifier "abc." In response to this request, OAS system 205 may access content unit 101 (i.e., the content unit with object identifier "abc") and may access metadata 103 to determine which portion of content unit 101 corresponds to the "Executive Summary" tag. Once OAS system 205 determines the portion of the content unit that corresponds to this tag, it may return this portion in response to the request.

In the example discussed above, each tag corresponds to a distinct portion of the content unit, such that a portion corresponding to one tag does not overlap with any portions corresponding to other tags. However, the invention is not limited in this respect, as in some embodiments, there may be overlap. For example, in some embodiments, one tag may correspond to the first 500 kilobytes of a content unit, while another tag corresponds to kilobytes 250-750 of the content unit. Thus, the portions of the content unit referenced by these two tags may each include kilobytes 250-500 of the content unit.

In addition, in the example above, metadata 103 identifies the portion of the content unit that corresponds to a tag using a size of the portion and an offset in the content unit at which the portion begins. However, the invention is not limited in this respect, as the metadata may identify the portion of a content unit that corresponds to a tag in any suitable way, and the invention is not limited in this respect. For example, in some embodiments, the metadata may directly identify the portion of content unit, rather than using a size and offset. That is, for example, the metadata may indicate that a first tag corresponds to bytes 0-500 of the content unit and that a second tag corresponds to bytes 1200-1500 of the content unit.

The metadata that identifies the separately accessible portions of a content unit (e.g., metadata 103 in FIG. 1) may be associated with the content unit in any suitable way, as the invention is not limited in this respect. For example, in some embodiments, the metadata may be associated with the content unit using a CDF/blob architecture. In such an architecture, there are at least two types of content units: blobs and content descriptor files (CDFs). Each blob has at least one CDF associated with it. A CDF stores metadata about the content stored in its associated blob(s) and also includes a pointer to its associated blob(s). Because the CDF and its associated blob(s) are separate content units on an OAS system, each may have a separate object identifier and may be separately addressable via its object identifier. Examples of systems that employ a CDF/blob architecture are discussed in greater detail in some of the applications listed below in Table 1.

In some embodiments, the metadata identifying the portion of a content unit (i.e., a blob) that corresponds to each tag may be stored in the CDF for the content unit. In some embodiments, the CDF may include additional metadata about the blob that that it references. For example, the CDF may include metadata about the time of creation of the blob, the size of the blob, the user who created the blob, or any other suitable metadata.

In some embodiments, the metadata identifying the separately accessible portions of a content unit may be associated with the content unit using a XAM X-Set. XAM refers to the Storage Networking Industry Association's (SNIA) proposed Extensible Access Method (XAM) standard. In the XAM standard, an X-Set is an object that includes data and metadata about the data. A detailed discussion of the XAM standard can be found on the SNIA web site at http://www.snia.org/xam/home. Thus, in some embodiments, the metadata identifying the separately accessible portions of a content unit (and, optionally, other metadata about the content unit) may be stored in an X-Set with the content unit.

A CDF/blob and a XAM X-Set are only examples of ways in which the metadata defining separate portions of a content unit may be associated with the content unit. There are other possible ways of associating such metadata with a content unit and the invention is not limited to any particular way.

When sending an access request to an OAS system for a portion of a content unit stored thereon, the user may determine the tag that corresponds to the desired portion of the content unit in any suitable way, as the invention is not limited in this respect. For example, in some embodiments, when a user stores a content unit on an OAS system, the user may send information to the OAS system that indicates portions of the content unit that the user desires to be separately accessible and may indicate tag names for each of these portions. This information may be associated with the content unit and stored on the OAS system, so that the OAS system may use it in responding to a subsequent access request for a portion of the content unit.

Because the user that stored the content unit specified the tag names and their corresponding portions of the content unit, the user may know which portion of the content unit corresponds to each tag name when making subsequent access requests for portions of the stored content unit. In addition, in some embodiments, the user and/or OAS system may share the information indicating the tag names and their corresponding portions of the content unit with other users to enable these users to issue requests for portions of the content unit.

Figure 3:
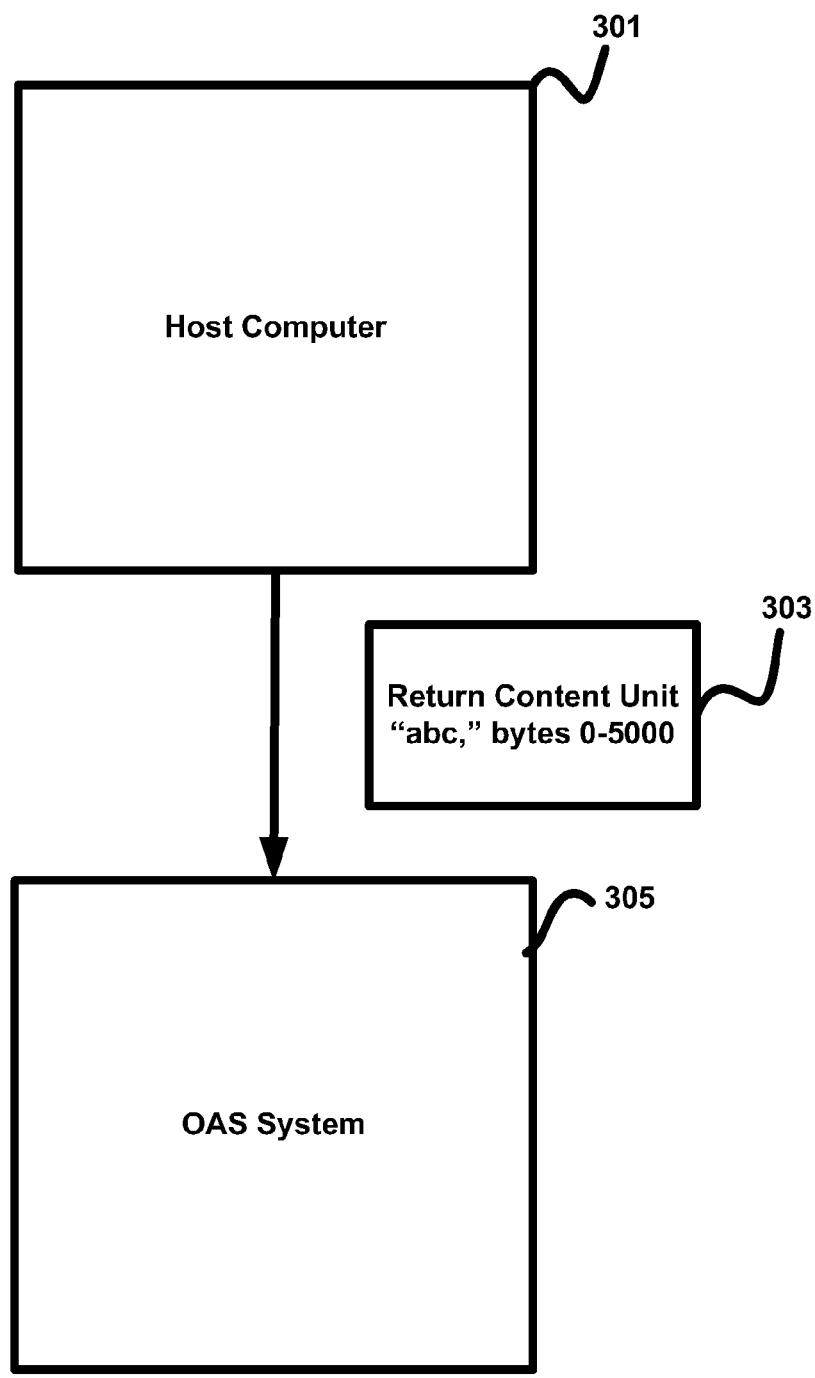
FIG. 3 is a block diagram of a system in which a request for a content unit on an OAS system may directly specify a portion of the content unit to be accessed, in accordance with one embodiment.

In some embodiments, when a user desires to access a portion of a content unit stored on an OAS system, the user may directly specify the portion of the content unit that it desires, rather than indirectly specifying the portion via a tag name. For example, in some embodiments, an access request for a portion of a content unit may identify the content unit using its object identifier and may directly indicate the portion of the content unit that is desired (e.g., by specifying the desired bits or bytes of the content unit). An example is shown in FIG. 3. In FIG. 3, host computer 301 sends an access request 303 to OAS system 305. Access request 303 may request OAS system 305 to return bytes 0-5000 of the content unit having the object identifier "abc." In response to this request, OAS system 305 may access the requested content unit and return the portion of the content unit identified in the request. In embodiments in which a user directly specifies the desired bytes of a content unit, the OAS system need not store metadata indicating tag names and the portions of the content unit that correspond to each tag, as this metadata is not needed to determine which portion of the content unit a requestor desired. Rather, the portion of the content unit that is desired may be directly specified in the access request.

In the example of FIG. 3, request 303 directly identifies the desired portion of the content unit by specifying the bytes in the content unit that correspond to the desired portion. However, the invention is not limited in this respect, as a request may directly identify a desired portion of a content unit in any suitable way. For example, in some embodiments, the request may specify the size of the desired portion of the content unit and an offset in the content unit at which the desired portion begins.

In the examples above, access requests to OAS systems specify (either directly or indirectly) a portion of a content unit that is desired to be returned. However, an access request for a content unit need not identify a specific portion of the content unit, and may simply identify the content unit as a whole (e.g., by indicating that object identifier for the content unit). When an OAS system receives an access request for a content unit that does not identify a specific portion of the content unit that is desired, the OAS system may respond in any suitable way. For example, in some embodiments, the OAS system may return the entire content unit in response to the request. Alternatively, in some embodiments, the OAS system may send a communication to the issuer of the request asking if a specific portion is desired.

As discussed above, some embodiments are directed to OAS systems in which different access permissions may be assigned to different portions of a single content unit. This may be done in any suitable was, as the invention is not limited in this respect.

Figure 4:
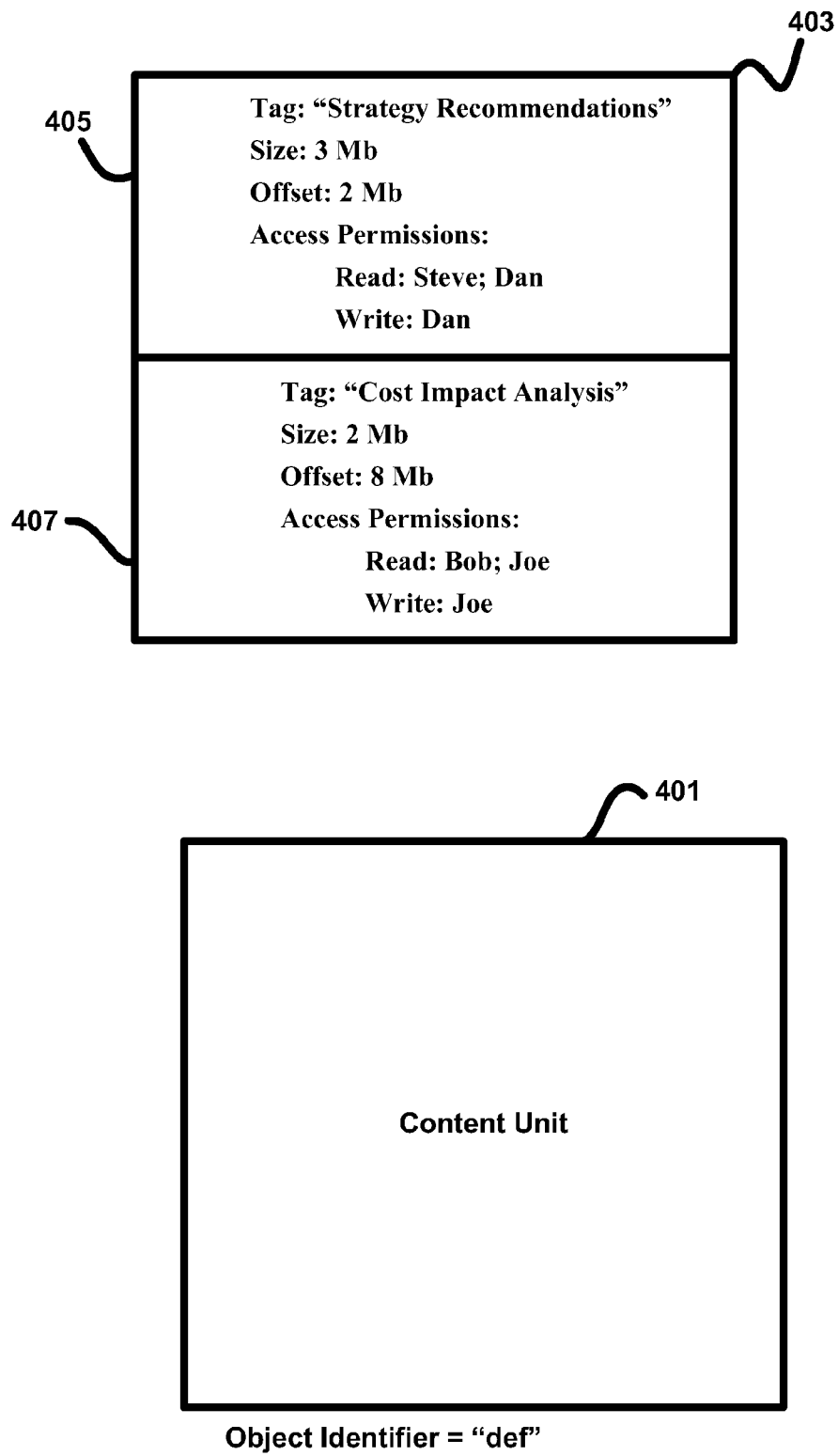
FIG. 4 is a block diagram of a system in which metadata that defines access permissions for separate portions of a content unit may be stored, in accordance with one embodiment.

For example, in some embodiments, an OAS system may store metadata for a content unit that indicates the access permissions for each portion of the content unit. For example, as shown in FIG. 4, an OAS system may store a content unit having an object identifier "def." The OAS system may also store metadata 403 that is associated with content unit 401 and that defines access permissions for different portions of content unit 401. Metadata 403 may be associated with content unit 401 in any suitable way, including using any of the above-discussed ways for associating metadata with a content unit.

Metadata 403 defines two tags. Tag 405 has the name "Strategy Recommendations" and corresponds to the portion of content unit 401 that is the three megabytes of content beginning two megabytes in. Metadata 403 defines the access permissions for this portion of content unit 401. That is, the metadata specifies that users Steve and Dan have read permissions for this portion of the content unit and that Dan also has write permissions for this portion of the content unit.

Tag 407 has the name "Cost Impact Analysis" and corresponds to the portion of content unit 401 that is the two megabytes of content beginning eight megabytes in. The metadata indicates that the Bob and Joe have read permission for this portion of the content unit and that Joe also has write permissions.

When a request is received to access a portion of the content unit (e.g., a request to read or write the portion of the content unit) and identifies the portion of the content unit, the OAS system may access the metadata to determine whether the requestor has permission to perform the designated action. For example, if Steve issues a request to the OAS system to read the "Strategy Recommendations" portion of content unit 401, identifying the content unit via its object identifier and identifying the desired portion of the content unit via its tag name, the OAS system may access metadata 403 to determine whether Steve has been granted read permissions to that portion of the content unit. When the OAS system determines that Steve has read permissions for the requested portion, the OAS system may return the requested portion in response to the request. By contrast, if Steve were to issue a request to the OAS system to write to the "Strategy Recommendations" portion of content unit 401, the OAS system would deny the request because Steve does not have write access permissions to the content unit.

In the example of FIG. 4, metadata 403 identifies the access permissions of individual persons for different portions of the content unit using their system assigned usernames. However, the invention is not limited in this respect, as the metadata may set forth access permissions for any type of user (e.g., person, application program, host computer, or any other suitable type of user), group of users, or class of users. For example, the access permissions may grant access permissions to a particular class of users (e.g., system administrators).

In addition, in the example of FIG. 4, metadata 403 identifies users via their usernames. However, the invention is not limited in this respect as the metadata may identify users using any suitable identifier or type of identifier. For example, in situations in which access permissions are granted to one or most host computers, the host computers may be identified in any suitable way. For example, the host computer may be identified via a host name, an IP address, a fibre channel world wide name, or in any other suitable way.

In the example of FIG. 4, metadata 403 defines access permissions for only two separate portions of content unit 401 and does not define access permissions for some portions of the content unit. However, the invention is not limited in this respect, as access permissions may be assigned for any suitable number of portions (distinct or overlapping) of a content unit. In addition, access permissions need not be assigned for all portions of the content unit, though they may.

In the example of FIG. 4, requests to access portions of content units identified the portions to be accessed using a tag name. However, the invention is not limited in this respect, as the portion may be accessed in any suitable way. For example, in some embodiments, the portion to be accessed may be identified using a size and offset (e.g., in the manner discussed above). In such embodiments, the metadata that specifies the access permissions for each portion of the content unit need not include tag names for those portions (though it may).

In some embodiments, an OAS system may allow for one or more users to be designated a "super-user" that can read any content unit, regardless of the access permissions for the content unit. Thus, if an access request to read a content unit or a portion of content unit is received from a super-user, the OAS system may grant the request even if the metadata for the content unit does not identify the user as having access to the content unit. One or more users may be designated super-users so that if content is stored on the OAS system that is unreadable (e.g., because the application program that stored the content unit failed to grant access to the content unit to any user) may be accessed. In some embodiments, in addition to metadata that defines access permissions for various portions of a content unit, metadata may be stored that defines access permissions for accessing all of the content of the content unit collectively as an integrated content unit. For example, in FIG. 4, metadata 403 may include metadata that indicates which users have access to all of the content unit of content unit 401, and, in some embodiments, what level of access each of these users has.

In some situations, a user may issue an access request to an OAS system for a content unit that identifies the content unit by its object identifier, but does not specify a portion of the content unit to be accessed. The OAS system may respond to such an access request in any suitable way, as the invention is not limited in this respect. For example, in some embodiments, if the access request is a read request and the requestor has read permission to a portion or portions of the content unit, the OAS system may return the portions of the content unit to which the user has access. The OAS system may optionally also return an indication that the returned content corresponds to only a portion of the content unit. In some embodiments, if the user does not have permission for all of the content of the content unit, the OAS system may deny the request.

Access permissions may be assigned in any suitable way, as the invention is not limited in this respect. For example, in some embodiments, when a user sends a request to store a content unit on the OAS system, the user may specify the access permissions for the content unit. That is, the user may send metadata to the OAS system that defines particular portions of the content unit and identifies which users have access to these portions. In some embodiments, a system administrator for the OAS system may define portions of a content unit stored on the OAS system and/or specify access permissions for these content units.

Various embodiments described above relate to content units stored on OAS systems. In some embodiments, these OAS systems may be content addressable storage (CAS) systems, and the object identifier used to identify content unit may be content address that is generated, at least in part, from at least a portion of the content of the content unit.

The above-described embodiments of the present invention can be implemented on any suitable computer, and a system employing any suitable type of storage system. Examples of suitable computers and/or storage systems are described in the patent applications listed below in Table 1 (collectively "the OAS applications"), each of which is incorporated herein by reference. It should be appreciated that the computers and storage systems described in these applications are only examples of computers and storage systems on which the embodiments of the present invention may be implemented, as the aspects of the invention described herein are not limited to being implemented in any particular way.

TABLE 1

| Title | Ser. No. | Filing Date |
| --- | --- | --- |
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus For Facilitating Access | 10/731,613 | Dec. 9, 2003 |

TABLE 1-continued

| Title | Ser. No. | Filing Date |
|---|---|---|
| To Content In A Data Storage System | | |
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |
| Methods And Apparatus For Modifying A Retention Period For Data In A Storage System | 10/762,044 | Jan. 21, 2004 |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |
| Methods and Apparatus For Including Storage System Capability Information In An Access Request To A Content Addressable Storage System | 10/911,248 | Aug. 4, 2004 |
| Methods And Apparatus For Tracking Content Storage In A Content Addressable Storage System | 10/911,247 | Aug. 4, 2004 |
| Methods and Apparatus For Storing Information Identifying A Source Of A Content Unit Stored On A Content Addressable System | 10/911,360 | Aug. 4, 2004 |
| Software System For Providing Storage System Functionality | 11/021,892 | Dec. 23, 2004 |
| Software System For Providing Content Addressable Storage System Functionality | 11/022,022 | Dec. 23, 2004 |
| Methods And Apparatus For Providing Data Retention Capability Via A Network Attached Storage Device | 11/022,077 | Dec. 23, 2004 |
| Methods And Apparatus For Managing Storage In A Computer System | 11/021,756 | Dec. 23, 2004 |
| Methods And Apparatus For Processing Access Requests In A Computer System | 11/021,012 | Dec. 23, 2004 |
| Methods And Apparatus For Accessing Information In A Hierarchical File System | 11/021,378 | Dec. 23, 2004 |
| Methods And Apparatus For Storing A Reflection On A Storage System | 11/034,613 | Jan. 12, 2005 |
| Method And Apparatus For Modifying A Retention Period | 11/034,737 | Jan. 12, 2005 |
| Methods And Apparatus For Managing Deletion of Data | 11/034,732 | Jan. 12, 2005 |
| Methods And Apparatus For Managing The Storage Of Content | 11/107,520 | Apr. 15, 2005 |
| Methods And Apparatus For Retrieval Of Content Units In A Time-Based Directory Structure | 11/107,063 | Apr. 15, 2005 |
| Methods And Apparatus For Managing The Replication Of Content | 11/107,194 | Apr. 15, 2005 |
| Methods And Apparatus For Managing the Storage Of Content In A File System | 11/165,104 | Jun. 23, 2005 |
| Methods And Apparatus For Accessing Content Stored In A File System | 11/165,103 | Jun. 23, 2005 |
| Methods And Apparatus For Storing Content In A File System | 11/165,102 | Jun. 23, 2005 |
| Methods And Apparatus For Managing the Storage of Content | 11/212,898 | Aug. 26, 2005 |
| Methods And Apparatus For Scheduling An Action on a Computer | 11/213,565 | Aug. 26, 2005 |
| Methods And Apparatus For Deleting Content From A Storage System | 11/213,233 | Aug. 26, 2005 |
| Method and Apparatus For Managing The Storage Of Content | 11/324,615 | Jan. 3, 2006 |
| Method and Apparatus For Providing An Interface To A Storage System | 11/324,639 | Jan. 3, 2006 |
| Methods And Apparatus For Managing A File System On A Content Addressable Storage System | 11/324,533 | Jan. 3, 2006 |
| Methods And Apparatus For Creating A File System | 11/324,637 | Jan. 3, 2006 |
| Methods And Apparatus For Mounting A File System | 11/324,726 | Jan. 3, 2006 |
| Methods And Apparatus For Allowing Access To Content | 11/324,642 | Jan. 3, 2006 |
| Methods And Apparatus For Implementing A File | 11/324,727 | Jan. 3, 2006 |

TABLE 1-continued

| Title | Ser. No. | Filing Date |
|---|---|---|
| System That Stores Files On A Content Addressable Storage System | | |
| Methods And Apparatus For Reconfiguring A Storage System | 11/324,728 | Jan. 3, 2006 |
| Methods And Apparatus For Increasing The Storage Capacity Of A Storage System | 11/324,646 | Jan. 3, 2006 |
| Methods And Apparatus For Accessing Content On A Storage System | 11/324,644 | Jan. 3, 2006 |
| Methods And Apparatus For Transferring Content From A Storage System | 11/392,969 | Mar. 28, 2006 |
| Methods And Apparatus For Requesting Content From A Storage System | 11/391,654 | Mar. 28, 2006 |
| Methods And Apparatus For Transferring Content To Multiple Destinations | 11/392,981 | Mar. 28, 2006 |
| Methods And Apparatus For Receiving Content From A Storage System At Multiple Servers | 11/390,878 | Mar. 28, 2006 |
| Methods And Apparatus For Transferring Content From An Object Addressable Storage System | 11/390,564 | Mar. 28, 2006 |
| Methods And Apparatus For Requesting Content From An Object Addressable Storage System | 11/391,636 | Mar. 28, 2006 |
| Methods And Apparatus For Conversion Of Content | 11/438,770 | May 23, 2006 |
| Methods And Apparatus For Selecting A Data Format For A Content Unit | 11/439,025 | May 23, 2006 |
| Methods And Apparatus For Accessing A Content Unit On A Storage System | 11/439,022 | May 23, 2006 |
| Methods And Apparatus For Enabling Selection Of A Content Unit Data Format | 11/438,817 | May 23, 2006 |
| Methods And Apparatus For Accessing Content | 11/474,658 | Jun. 26, 2006 |
| Methods And Apparatus For Providing Access To Content | 11/474,846 | Jun. 26, 2006 |
| Methods And Apparatus For Retrieving Stored Content | 11/474,655 | Jun. 26, 2006 |
| Methods And Apparatus For Accessing Content Through Multiple Nodes | 11/474,661 | Jun. 26, 2006 |
| Methods And Apparatus For Receiving Content | 11/474,719 | Jun. 26, 2006 |
| Methods And Apparatus For Processing Access Requests | 11/474,749 | Jun. 26, 2006 |
| Methods And Apparatus For Providing Content | 11/474,802 | Jun. 26, 2006 |
| Methods And Apparatus For Managing Content | 11/483,465 | Jul. 10, 2006 |
| Methods And Apparatus For Moving Content | 11/483,799 | Jul. 10, 2006 |
| Methods And Apparatus For Storing Content | 11/483,494 | Jul. 10, 2006 |
| Methods And Apparatus For Caching Content In A Computer System Employing Object Addressable Storage | 11/519,374 | Sep. 12, 2006 |
| Methods And Apparatus For Selection Of A Storage Location For A Content Unit | 11/644,430 | Dec. 22, 2006 |
| Methods And Apparatus For Modifying An Object Identifier For A Content Unit | 11/644,423 | Dec. 22, 2006 |
| Methods And Apparatus For Storing Content On A Storage System | 11/644,174 | Dec. 22, 2006 |
| Methods And Apparatus For Increasing The Storage Capacity Of A Zone Of A Storage System | 11/644,857 | Dec. 22, 2006 |
| Methods And Apparatus For Selecting A Storage Zone For A Content Unit | 11/644,428 | Dec. 22, 2006 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of accessing a content unit stored on an object addressable storage (OAS) system, the content unit having a first portion and a second portion and being identified via an object identifier that is, from the perspective of a user accessing the content unit on the OAS system, independent of a storage location of the content unit on the OAS system, the method comprising acts, performed by at least one hardware processor, of:

assigning a first set of access permissions to the first portion of the content unit, wherein the first set of access permissions specifies a first set of users permitted to access the first portion of the content unit, wherein the act of assigning a first set of access permission to the first portion of the content unit further comprises acts of:
storing metadata on the OAS system that defines the first portion of the content unit; and
storing metadata on the OAS system that defines the first set of access permissions for the first portion of the content unit; and
assigning a second set of access permissions to the second portion of the content unit, wherein the second set of access permissions is different from the first set of access permissions, and wherein the second set of access permissions specifies a second set of users permitted to access the second portion of the content unit,
wherein the OAS system is a content addressable storage (CAS) system, and wherein the object identifier that identifies the content unit is a content address that is generated, at least in part, from at least a portion of the content of the content unit.

2. The method of claim 1, wherein the act of storing metadata on the OAS system that defines a portion of the content unit further comprises an act of:
storing metadata that identifies bytes in the content unit that comprise the first portion of the content unit.

3. The method of claim 1, wherein the act of storing metadata on the OAS system that defines a portion of the content unit further comprises an act of:
storing metadata that defines an identifier for the first portion of the content unit.

4. The method of claim 1, wherein the first set of users comprises at least one user selected from the group consisting of:
a person;
an application program; and
a host computer.

5. At least one non-transitory computer readable medium, encoded with instructions that, when executed, perform a method of accessing a content unit stored on an object addressable storage (OAS) system, the content unit having a first portion and a second portion and being identified via an object identifier that is, from the perspective of a user accessing the content unit on the OAS system, independent of a storage location of the content unit on the OAS system, the method comprising acts of:

assigning a first set of access permissions to the first portion of the content unit, wherein the first set of access permissions specifies a first set of users permitted to access the first portion of the content unit, wherein the act of assigning a first set of access permission to the first portion of the content unit further comprises acts of:
storing metadata on the OAS system that defines the first portion of the content unit; and
storing metadata on the OAS system that defines the first set of access permissions for the first portion of the content unit; and
assigning a second set of access permissions to the second portion of the content unit, wherein the second set of access permissions is different from the first set of access permissions, and wherein the second set of access permissions specifies a second set of users permitted to access the second portion of the content unit,
wherein the OAS system is a content addressable storage (CAS) system, and wherein the object identifier that identifies the content unit is a content address that is generated, at least in part, from at least a portion of the content of the content unit.

6. The at least one non-transitory computer readable medium of claim 5, wherein the act of storing metadata on the OAS system that defines a portion of the content unit further comprises an act of:
storing metadata that identifies bytes in the content unit that comprise the first portion of the content unit.

7. The at least one non-transitory computer readable medium of claim 5, wherein the act of storing metadata on the OAS system that defines a portion of the content unit further comprises an act of:
storing metadata that defines an identifier for the first portion of the content unit.

8. The at least one non-transitory computer readable medium of claim 5, wherein the first set of users comprises at least one user selected from the group consisting of:
a person;
an application program; and
a host computer.

9. An object addressable storage (OAS) system that stores a content unit having a first portion and a second portion and being identified via an object identifier that is, from the perspective of a user accessing the content unit on the OAS system, independent of a storage location of the content unit on the OAS system, the OAS system comprising:

an interface that receives an indication of a first set of access permissions for the first portions of the content unit and a second set of access permissions, different from the first set of access permissions, for the second content unit, wherein the first set of access permissions specifies a first set of users permitted to access the first portion of the content unit and wherein the second set of access permissions specifies a second set of users permitted to access the second portion of the content unit; and at least one controller, comprising at least one processor and coupled to the interface, that:
assigns the first set of access permissions to the first portion of the content unit;
assigns a second set of access permissions to the second portion of the content unit;
stores metadata that defines the first portion of the content unit; and
stores metadata that defines the first set of access permissions for the first portion of the content unit,
wherein the OAS system is a content addressable storage (CAS) system, and wherein the object identifier that identifies the content unit is a content address that is generated, at least in part, from at least a portion of the content of the content unit.

10. The OAS system of claim 9, wherein the at least one controller:
stores metadata that identifies bytes in the content unit that comprise the first portion of the content unit.

11. The system of claim 9, wherein the at least one controller:
stores metadata that defines an identifier for the first portion of the content unit.

* * * * *